United States Patent
Sundaresan

(10) Patent No.: US 7,801,949 B2
(45) Date of Patent: Sep. 21, 2010

(54) CONFIGURABLE INTERFACES

(75) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 934 days.

(21) Appl. No.: 11/646,709

(22) Filed: Dec. 28, 2006

(65) Prior Publication Data
US 2007/0288609 A1 Dec. 13, 2007

Related U.S. Application Data

(60) Provisional application No. 60/804,385, filed on Jun. 9, 2006.

(51) Int. Cl.
*G06F 15/16* (2006.01)

(52) U.S. Cl. ............... 709/203; 709/219; 709/250; 705/37

(58) Field of Classification Search ............ 709/203, 709/217–219, 250; 705/37
See application file for complete search history.

(56) References Cited

U.S. PATENT DOCUMENTS

| | | | | |
|---|---|---|---|---|
| 7,013,289 B2* | 3/2006 | Horn et al. | | 709/203 |
| 7,415,715 B2* | 8/2008 | Fradkov et al. | | 709/217 |
| 2005/0102242 A1* | 5/2005 | Omidyar | | 705/65 |
| 2005/0251510 A1* | 11/2005 | Billingsley et al. | | 707/3 |
| 2006/0129475 A1* | 6/2006 | Badenhorst et al. | | 705/37 |
| 2007/0156516 A1* | 7/2007 | Moissinac et al. | | 705/14 |

* cited by examiner

*Primary Examiner*—Philip B Tran
(74) *Attorney, Agent, or Firm*—Schwegman, Lundberg & Woessner, P.A.

(57) ABSTRACT

Embodiments of a method and system for utilizing a configurable interface are disclosed. An interface server may include a configurable interface. The configurable interface may provide a user interface to enable communication in a system with a client operating on a client machine. An interface data structure comprising may include a structure application program interface (API) and one or more functional components. The structure API may provide an interface for communication between the configurable interface and an application server. The one or more functional components may provide functionality to the configurable interface server-side for enabling communication through the structure API with an application hosted on the application server.

19 Claims, 7 Drawing Sheets

CONFIGURABLE INTERFACES

RELATED APPLICATIONS

This application claims the priority benefit of U.S. Provisional Application Ser. No. 60/804,385, filed Jun. 9, 2006, which is incorporated herein by reference.

TECHNICAL FIELD

The present application relates generally to the field of data communication and, in one specific example, to a method and system for utilizing a configurable interface.

BACKGROUND

An interface may be used to provide access to a networked system (e.g., a web site). The interface is typically defined by the networked system to provide users accessing the networked system with a similar and consistent interface.

BRIEF DESCRIPTION OF THE DRAWINGS

Some embodiments are illustrated by way of example and not limitation in the figures of the accompanying drawings in which.

DETAILED DESCRIPTION

Example methods and systems for utilizing configurable interfaces are described. In the following description, for purposes of explanation, numerous specific details are set forth in order to provide a thorough understanding of example embodiments. It will be evident, however, to one skilled in the art that the present invention may be practiced without these specific details.

In an example embodiment, an interface server may include a configurable interface. The configurable interface may provide a user interface to enable communication in a system with a client operating on a client machine. An interface data structure may include a structure application program interface (API) and at least one component. The structure API may provide an interface for communication between the configurable interface and an application server. The at least one component may provide functionality to the configurable interface server-side to enable communication through the structure API with an application hosted on the application server.

In an example embodiment, an interface selection may be received. The interface selection may be a selection of a configurable interface. The configurable interface may provide a user interface to enable communication in a system with a client operating on a client machine. A structure application program interface (API) and at least one component may be associated with the configurable interface. The structure API may provide an interface for communication between the configurable interface and an application server. The at least one component may provide functionality to the configurable interface server-side for enabling communication through the structure API with an application hosted on the application server. The configurable interface may be configured with the structure API and the at least one component. The configurable interface may be provided in the system for communication with the application.

In an example embodiment, a communication may be received in a system with a configurable interface. The configurable interface may provide a user interface to enable communication in the system with a client operating on a client machine. The configurable interface may receive functionality server-side from at least one component to enable communication with an application hosted on an application server. At least one functional component may be identified from the at least one component relevant to the communication. The communication may be processed with the at least one functional component. A result may be received from the application as a result of processing the communication. The result may be presented to the client through the configurable interface.

Figure 1:
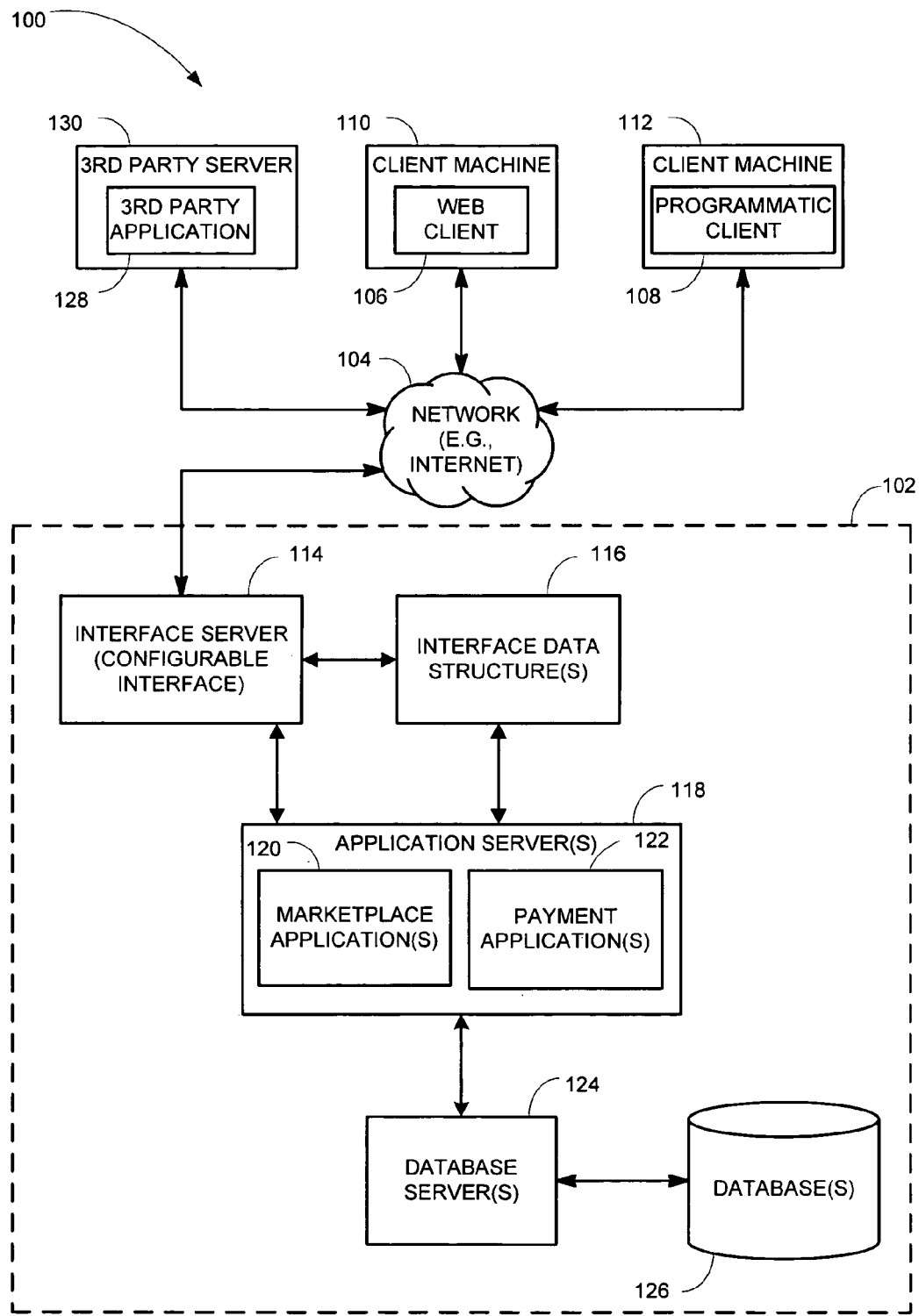
FIG. 1 is a network diagram depicting a network system, according to one embodiment, having a client server architecture configured for exchanging data over a network.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An interface server 114 is in communication with an interface data structures 116 to provide a configured interfaces (e.g., programmatic and/or web interfaces) to one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

In an example embodiment, the operations of the configurable interface 114 that enables communication with the client machines 110, 112 and the and/or the third party server 130 may be separate from the functionality provided by the user interface data structure 116 that enables data to be sent and received from the multiple applications 120, 122 through the application server 118. For example, the use of the configurable interface 114 in communication with the interface data structure 116 may enable the configurable interface 114 to incorporate functional components of the interface data structure 116 selected to be implemented server-side for providing different user experiences to a number of users while interacting with the networked system 102 through the client machines 110, 112. An example embodiment of the interface data structure 116 is described in greater detail below.

In an example embodiment, the configurable interface 114 may receive data from the interface data structures 116 and present the data to the web client 106 and/or the programmatic client 108 according to an interface selection. A method for accessing an interface selection is described in greater detail below.

Further, while the system 100 shown in FIG. 1 employs a client-server architecture, the present invention is not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the configurable interface supported by the interface server 114. The programmatic client 108 also accesses the various services and functions provided by the marketplace and payment applications 120 and 122 via the configurable interface provided by the interface server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the configurable interface provided by the interface server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
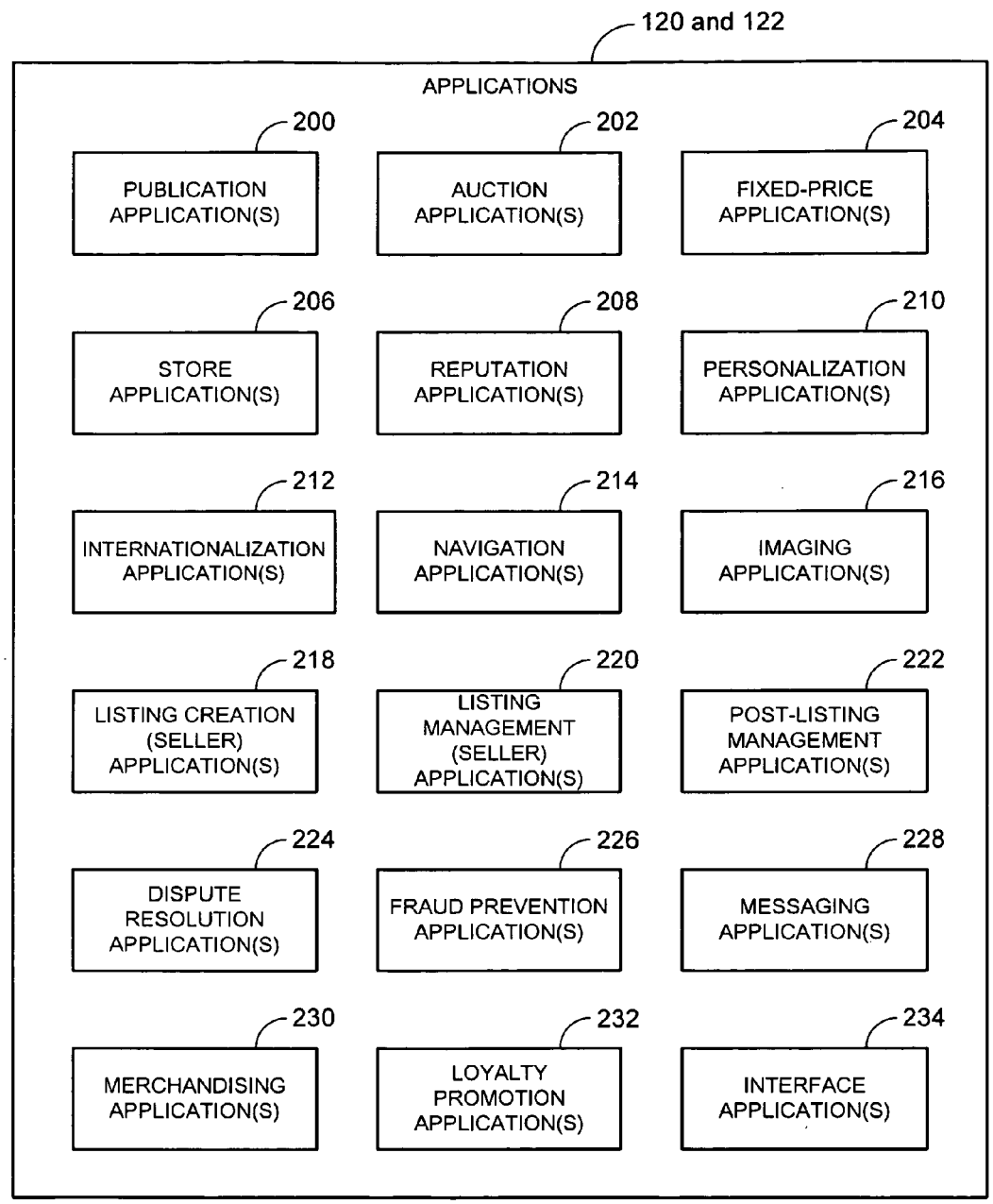
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Interface applications 234 may enable selection and/or creation of components that enable communication (e.g., for the web client 110, the programmatic client 112 and/or the third party application 128) through the configurable interface 114 with an application running on the application servers 118.

Figure 3:
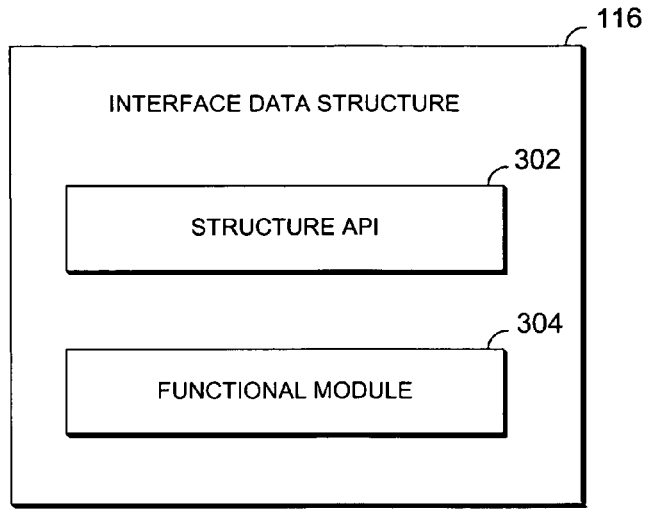
FIG. 3 is a block diagram of an example interface data structure.

Referring to FIG. 3, an interface data structure 116 (see FIG. 1) according to an example embodiment is illustrated. The interface data structure 116 may be an object or other data structure usable within the networked system 102 (see FIG. 1).

The user interface data structure 116 includes a structure Application Program Interface (API) 302 and a functional module 304. The structure API 302 provides an interface for communication between the configurable interface and the application server 118. In an example embodiment, the structure API 302 may enable a user and/or developer to create and/or utilize a number of the configurable user interfaces to operate with the networked system 102.

The functional module 304 includes a selection of components for providing functionality to the configurable interface (e.g., server-side) for enabling communication through the structure API 302 with an application hosted on the application server 118. An example embodiment of the functional module 304 is described in greater detail below.

In an example embodiment, instead of users being able to select an overlay (e.g., a skin) that alters look and feel of the interface by making a client-side change to a same interface, the users may select the functional components of the configurable interface that are to be used server-side.

Figure 4:
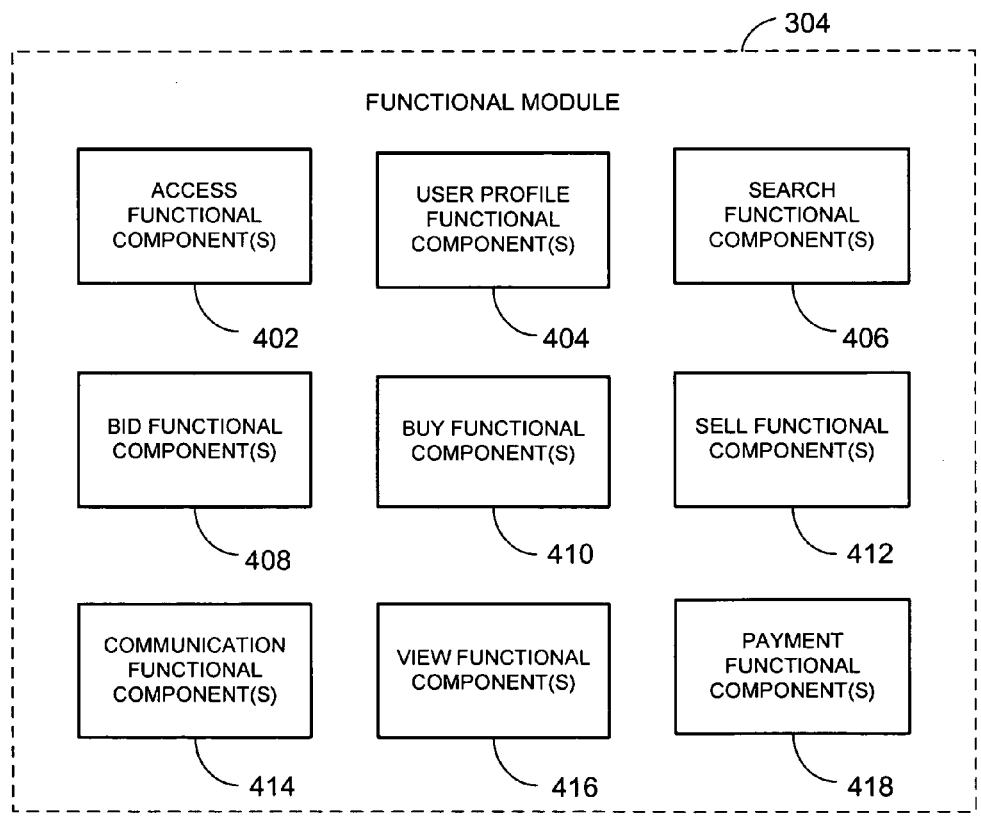
FIG. 4 is a block diagram of an example functional module that may be deployed in the interface data structure.

Referring to FIG. 4, a functional module 304 (see FIG. 3) according to an example embodiment is illustrated. The functional module 304 includes a number of functional components to provide functionality for a user to access a system (e.g., the networked system 102). For example, the functional components 402-418 may communicate with the marketplace and payment applications 120, 122 (see FIG. 1) of the networked system 102 to enable a user to interact with the marketplace and payment applications 120, 122.

The functional module 304 may include one or more access functional components 402, one or more user profile functional component 404, one or more search functional component 406, one or more bid functional component 408, one or more buy functional component 410, one or more sell functional components 412, one or more communication functional components 414, one or more view functional components 416, and/or one or more payment functional component 418. It may be appreciated that other functional components may also be included and used to interact with the networked system 102.

The access functional components 402 provide functionality to enable a user to access a system through the configurable interface. For example, the access functional component 402 may enable a user to log on and log off of the networked system 102 and/or communicate with the marketplace and payment applications 120, 122.

The user profile functional components 404 provide functionality to enable a user profile of the user to be retained and used within a system. For example, the user profile functional component 404 may enable use of user profiles (e.g., as may be stored in the database 126) when accessing the networked system 102.

The search functional components 406 provide functionality to enable a user to conduct a search of a system through the configurable interface. For example, the search functional component 406 may enable a user of the networked system 102 to search for listings of items for sale (e.g., fixed-price and/or auction), system information, other users of the networked system 102, and the like.

The bid functional components 408 provide functionality to enable the user to bid for a selection of value (e.g., an item) through the configurable interface that is listed for sale through auction. The buy functional component 410 provides functionality to enable the user to buy an item that is for sale. The sell functional component 412 provides functionality to enable the user to sell an item (e.g., through listing at a fixed-price listing and/or auction listing).

The communication functional components 414 provide functionality to communicate (e.g., through the configurable interface) among users of a system. For example, the communication functional component 414 may enable communication among users of the networked system 102 and/or system administration.

The view functional components 416 provide functionality to enable viewing of information (e.g., text and/or pictures) of a selection of value. The payment functional component 418 provides functionality to enable payment for an item purchased and/or receive payment for an item sold.

In an example embodiment, the functional components 402-418 may be selected and/or created by the user interface application 234 (see FIG. 2).

A selection may be made of the functional components 402-418 to be included in the functional module 400 depending on the functionality desired for the configurable user interface 115. For example, all functional components 402-418 may be included in the functional module 400 or a subset of the available functional components 402-418 may be included in the functional module 400.

In an example embodiment, a selection may be made from among a plurality of available functional components of the same type. For example, more than one of the search functional component 406 may be available for selection with a configurable interface. By way of example, a selection of a first search functional component 406 may enable a user to enter a text string for a search in a search box, receive a number of search results, and select a search result to obtain additional details through the configurable user interface. A selection of a second search functional component 406 may enable a user to enter a text string for a search into a search box, receive a number of search results, and select search results from the number of search results to receive a side-by-side comparison of the selected search results through the configurable user interface. A selection of a third search functional component 406 may enable a user to visually select pictures of a number of products (e.g., without showing relating text) to enable the user to select a product to see similar products through the configurable user interface.

By way of a further example of the availability of a plurality of available functional components of the same type, a selection of a first type of the view functional component 416 may enable a user to view attributes of a selected product. A selection of a second type of the view functional component 416 may enable a user to view an image of the product and one or more images of similar products. A selection of a third type of the view functional component 416 may enable a user to view an image of the product from more than one view (e.g., a front view, a side view, or a back view).

Figure 5:
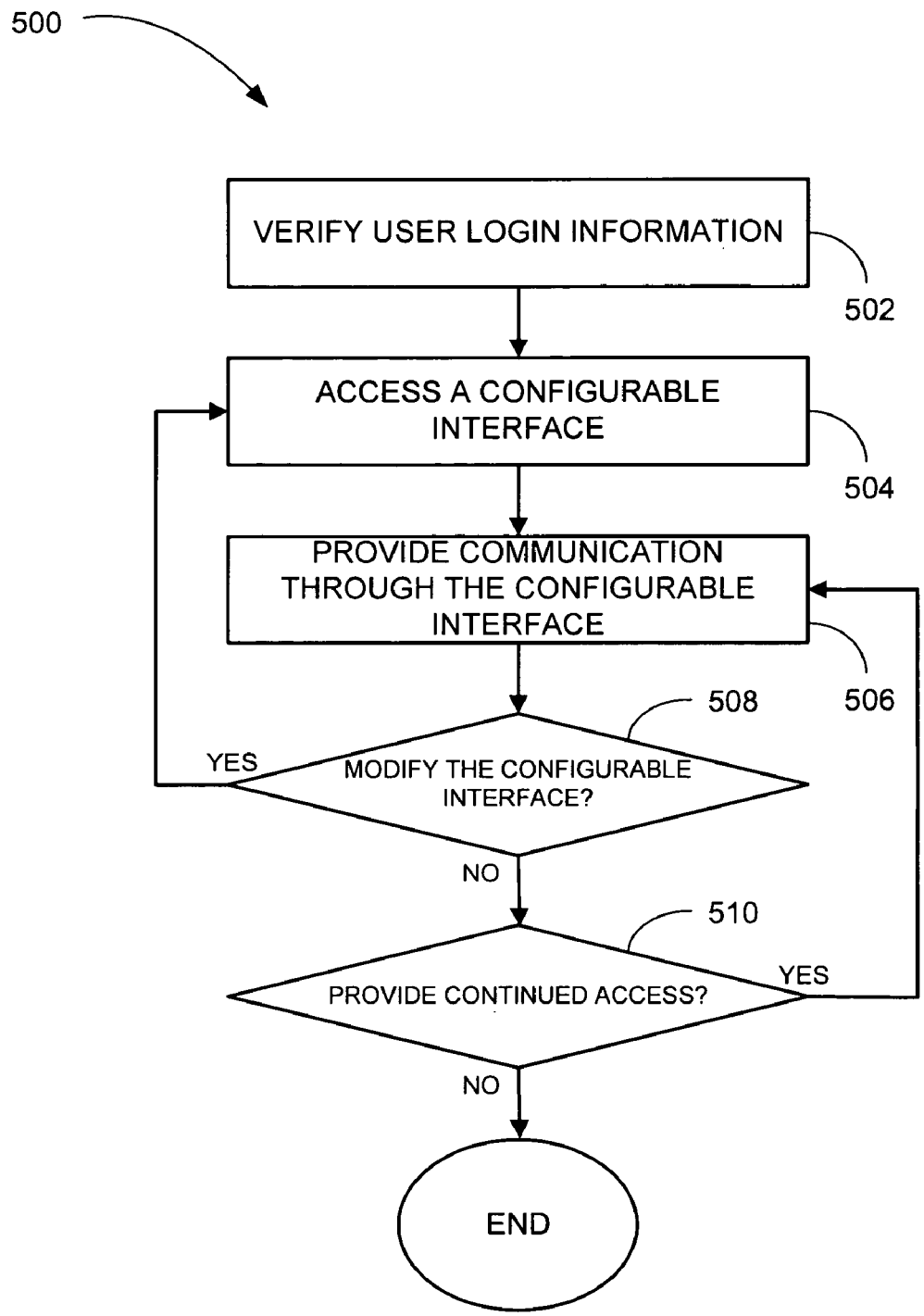
FIG. 5 is a flowchart illustrating a method for providing system access according to an example embodiment.

Referring to FIG. 5, a method 500 for providing system access in accordance with an example embodiment is illustrated. In an example embodiment, the method 500 may be performed by the interface application 234 (see FIG. 2).

User login information may be verified at block 502. For example, a user may provide a user name and a password to access the networked system 102 (see FIG. 1).

A configurable interface may be accessed at block 504. For example, a user may select a configurable interface (e.g., for the interface server 114), the interface application 234 may select the configurable interface, or the configurable interface may be pre-selected. An example embodiment of a method for accessing a configurable interface is described in greater detail below.

Communication may be provided through the configurable interface with an application hosted on the application server 118 and presented to the user through a client (e.g., the web client 106 or programmatic client 108) at block 506. An example embodiment of communicating through the configurable interface is described in greater detail below.

A determination may be made at decision block 508 whether to modify the configurable interface. If a determination is made to modify the configurable interface, the method 500 may return to block 504. If a determination is made not to modify the configurable interface at decision block 508, the method 500 may proceed to decision block 510.

At decision block 510, a determination may be made as to whether continued access is to be provided through the configurable interface. If a determination is made that continued access is to be provided, the method 500 may return to block 506. If a determination is made that continued access is not to be provided at block 506, the method 500 may terminate.

Figure 6:
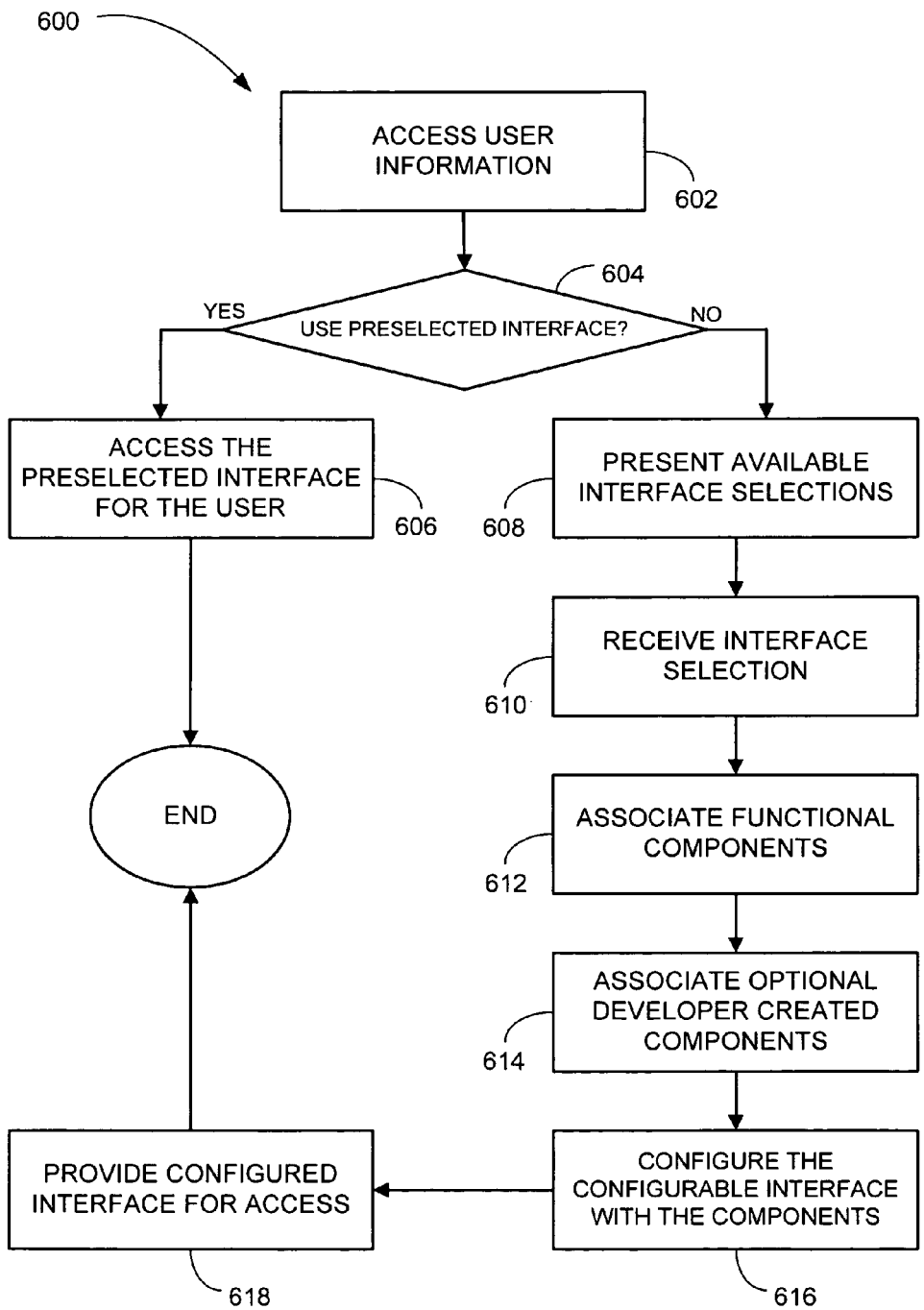
FIG. 6 is a flowchart illustrating a method for accessing a configurable interface.

Referring to FIG. 6, a method 600 for accessing a configurable interface in accordance to an example embodiment is illustrated. In an example embodiment, the method 600 may be performed at the block 504 (see FIG. 5).

User information may be accessed at block 602. For example, the user information may include information regarding whether the user has a preselected configurable interface for communication.

At decision block 604, a determination may be made as to whether a preselected interface has been selected for the user. For example, the preselected interface may be a configurable interface selected by the user from a previous interaction with the networked system and associated with the user information of the user and/or or the preselected interface may be selected by the interface application 234 at random or based on a desired type of access by the user. By way of an example, a preselected configurable interface may be a first type when used for an auction site and a second type when used for a review site, or the preselected configurable interface may be a first type when used on a mobile device (e.g., the client machine 110, 112) or a second type when used on a computing system (e.g., the client machine 110, 112).

If the configurable interface has been preselected, the preselected interface may be accessed at block 606. If the configurable interface has not been preselected at decision block 604, available interface selections may be presented at block 608. For example, the available interface selections may include configurable interfaces created by users, developers and/or administrators of the site. Each configurable interface may be associated with one or more functional components, and/or the user may select one or more functional components to associate with the configurable interface. In an example embodiment, a user may create a new configurable interface (with or without one or more associated functionality components) for communicating with applications (e.g., the marketplace applications 120 and/or the payment applications 122) running on the application server 118.

An interface selection (e.g., a selection of a configurable interface) may be received from the user at block 610.

In an example embodiment, a default configurable interface may be used by the interface server 114 (see FIG. 1) to enable a user to make the interface selection.

The interface selection of the configurable interface may enable a first user to have a different experience that a second user with a same site (e.g., the networked system 102). For example, a first user may select a first configurable interface to enable searching of item listings one at a time, a second user may select a second configurable interface to enable searching and comparing items by use of a temporary basket available in the second configurable interface, and a third user may select a third configurable interface to enable searching to create a list of items on which the third user may bid.

In an example embodiment, the selected configurable interface may provide information for presentation on the web client 106, the programmatic client 110, and/or the third party application 128 differently even though the components associated with the configurable interface may be the same. For example, the configurable interface may be configured to provide output to the web client 106, the programmatic client 110, and/or the third party application 128 graphically, textually, and/or audibly.

The configurable interface may optionally be configured to modify the presentation of results (e.g., output) depending on one or more site factors (e.g., based on a type of item being browsed). For example, a diamond may be browsed in a first configuration and a writing pen may be browsed in a second configuration, a category of products, a class of products, a demography of the user, web accessibility (e.g., a personal computer or a hand-held device) of the user, and the like. The configurable interface may optionally be configured for different classes of users. For example, a teenager may use a first configuration and a senior citizen may use a second configuration.

One or more functional components 402-418 (see FIG. 4) and the structure API 302 (see FIG. 3) may be associated with the selected configurable interface at block 612. For example, the functional components may be associated with the selected configurable interface and/or selected by the user.

In an example embodiment, associating a structure API 302 during the operations at block 612 may provide an interface for communication between the configurable interface and an application server 118 and associating the one or more functional components 402-418 with the configurable interface may provide functionality to the configurable interface server-side for enabling communication through the structure API 302 with an application hosted on the application server 118.

Developer created components may optionally be associated with the selected configurable interface at block 614. For example, developer created components may include a scratch pad, a shipping cost calculator, a comparative shopping engine, and the like. The developer created components may include client-side components that are integrated into the interface during presentation (e.g., to a user). The developer created components may be associated with the selected configurable interface and/or selected by the user.

The configurable interface may be configured (e.g., associated) with the functional components and/or the developer created components at block 616. The configured interface may then be provided for communication with an application (e.g., as hosted on the application server 118) at block 618. Upon completion of the operations at block 606 or block 618, the method 600 may terminate.

In an example embodiment, configuration of the configurable interface at block 616 may be based on the interface selection and/or on constraints of a device presenting the configurable interface to the user. For example, the limited display of a portable communication device, such as a cell phone, personal digital assistant, and the like may limit the configuration of the configurable interface.

In an example embodiment, the operations at block 612 and block 614 may occur prior to the operations at block 608 and block 610 to first enable selection of components prior to making an interface selection.

Figure 7:
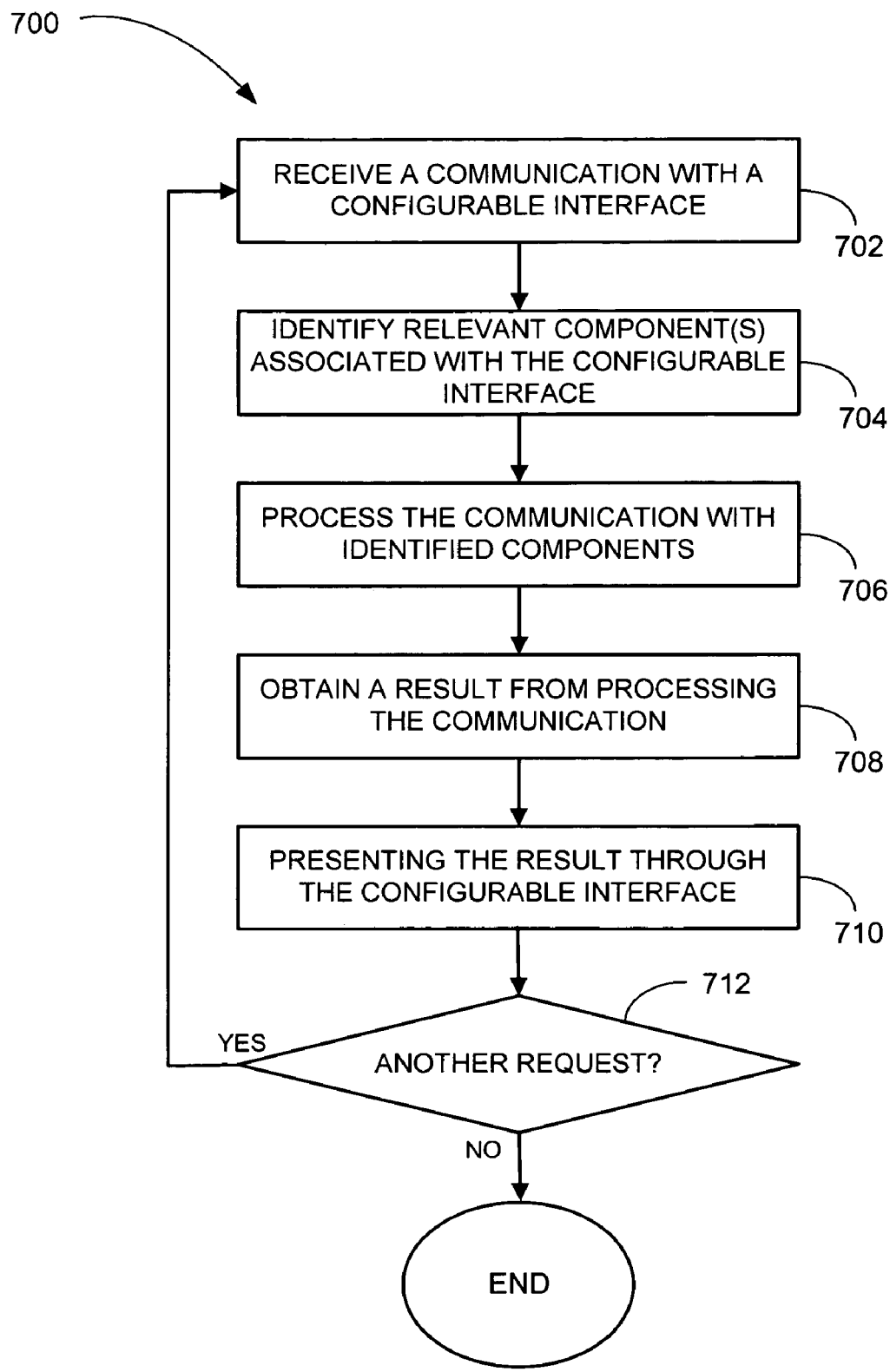
FIG. 7 is a flowchart illustrating a method for providing access through a configurable interface.

Referring to FIG. 7, a method 700 for providing access through a configurable interface according to an example embodiment is illustrated. In an example embodiment, the method 700 may be performed at block 506 (see FIG. 5).

A user communication may be received with the configurable interface at block 702. For example, a communication may be received in the system 102 with a configurable interface. The configurable interface may provide a user interface to enable communication in the system 102 with a client 106, 108 operating on the client machine 110, 112. The configurable interface may receive functionality server-side from one or more functional components 402-418 to enable communication with an application hosted on the application server 118.

One or more components (e.g., the functional components) that are associated with the configurable interface and relevant to the communication for may be identified at block 704.

The one or more identified components may process the user communication to communicate with the application server 118 and at block 706. The results of the processed request (e.g., as received from the application server 118) may be received at block 708 and presented to the client through the configurable interface at block 710.

At decision block 712, a determination may be made as to whether another communication will be received. If a determination is made that another communication will be received, the method 700 may return to block 702. If a determination is made at decision block 712 that another user communication will not be received, the method 700 may terminate.

Figure 8:
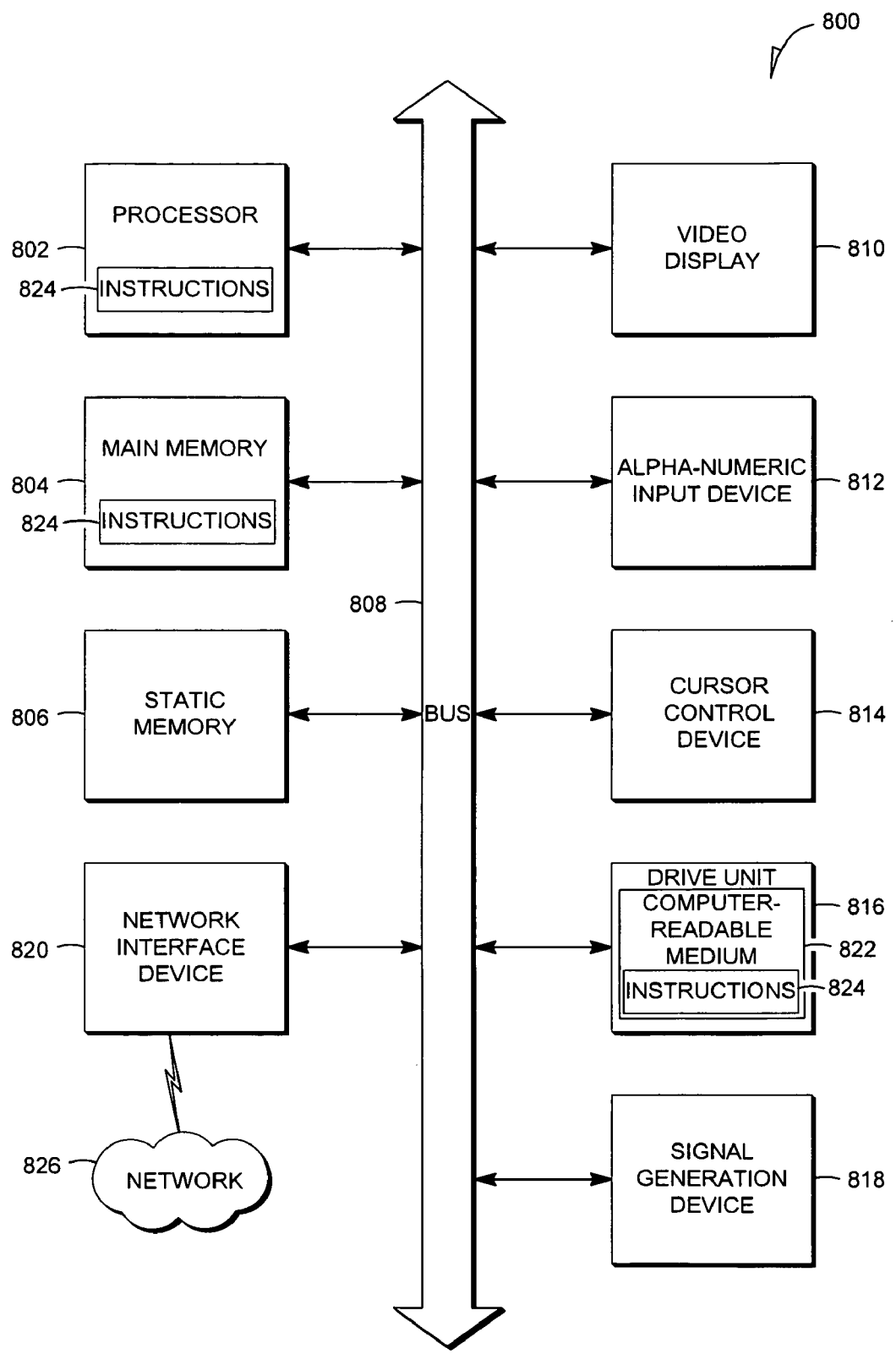
FIG. 8 shows a diagrammatic representation of machine in the example form of a computer system within which a set of instructions may be executed causing the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for utilizing configurable interfaces have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    an interface server comprising a configurable interface, the configurable interface providing a user interface to enable communication in a system with a client operating on a client machine, the configurable interface to present information to a first user in a different manner than to a second user; and
    an interface data structure comprising:
        a structure application program interface (API), the structure API providing an interface for communication between the configurable interface and an application server, and
        at least one component to provide functionality to the configurable interface server-side to enable communication through the structure API with an application hosted on the application server.

2. The system of claim 1, wherein the at least one component comprises at least one of:
    an access component to provide functionality to enable the first user to access the system through the configurable interface,
    a user profile component to provide functionality to enable a user profile of the first user to be retained and used within the system,
    a search component to provide functionality to enable the first user to conduct a search of the system through the configurable interface,
    a bid component to provide functionality to enable the first user to bid for a selection of value through the configurable interface that is listed for sale through auction,
    a buy component to provide functionality to enable the first user to buy the selection of value that is for sale,
    a sell component to provide functionality to enable the first user to sell the selection of value,
    a communication component to provide functionality to communicate through the configurable interface between the first user and a plurality of other users of the system,
    a view component to provide functionality to enable viewing of information of the selection of value, and
    a payment component to provide functionality to enable at least one of provide payment for the selection of value item or receive payment for the selection of value.

3. The system of claim 1, wherein the at least one component comprises one or more of an access component, a user profile component, a search component, a bid component, a buy component, a sell component, a communication component, a view component, and a pay component.

4. The system of claim 1, wherein the application is a payment application.

5. The system of claim 1, wherein the application is a marketplace application.

6. The system of claim 1, wherein the interface data structure is an object within the system.

7. A method comprising:
    receiving an interface selection, the interface selection being a selection of a configurable interface, the configurable interface to provide a user interface to enable communication in a system with a first client operating on a client machine, the configurable interface to present information to a first user in a different manner than to a second user;

associating a structure application program interface (API) and at least one component with the configurable interface to provide functionality to the configurable interface server-side for enabling communication through the structure API with an application hosted on an application server, the structure API to provide an interface for communication between the configurable interface and the application server;

configuring the configurable interface selection with the structure API and the at least one component; and providing the configurable interface in the system for communication with the application.

8. The method of claim 7, wherein the configured interface is a web interface.

9. The method of claim 7, wherein the configured interface is a programmatic interface.

10. The method of claim 7, wherein associating a structure application program interface (API) and at least one component with the configurable interface further comprises:

associating at least one developer component with the configurable interface, the at least one developer component to provide functionality to the configurable interface client-side; and configuring the configurable interface selection with the at least one developer component to present to the first user when using the configurable interface for communication with the system.

11. The method of claim 7, wherein configuring the configurable interface selection with the structure API and at least one component comprises:

configuring the configurable interface selection with the structure API and the one or more components to modify a presentation of results through the configurable interface selection based on a site factor.

12. The method of claim 11, wherein the site factor is based on a type of item being browsed by the first user in the system.

13. The method of claim 7, wherein configuring the configurable interface selection with the structure API and the at least one component comprises:

configuring the configurable interface selection with the structure API and the at least one component based on a display constraint of the client machine.

14. A method comprising:

receiving a communication in a system with a configurable interface, the configurable interface providing a user interface to enable communication in the system with a client operating on a client machine, the configurable interface receiving functionality server-side from at least one functional component to enable communication with an application hosted on an application server, the configurable interface to present information to a first user in a different manner than to a second user;

identifying at least one functional component from the at least one functional component relevant to the communication;

processing the communication with the at least one functional component;

receiving a result from the application as a result of processing the communication; and presenting the result to the client through the configurable interface.

15. A machine-readable non-transitory storage medium comprising instructions, which when executed by a machine, cause the machine to perform a method comprising:

receiving an interface selection, the interface selection a selection of a configurable interface, the configurable interface to provide a user interface to enable communication in a system with a client operating on a client machine, the configurable interface to present information to a first user in a different manner than to a second user;

associating a structure application program interface (API) and at least one component with the configurable interface, the at least one component to provide functionality to the configurable interface server-side for enabling communication through the structure API with an application hosted on an application server, the structure API to provide an interface for communication between the configurable interface and the application server;

configuring the configurable interface selection with the structure API and the at least one component; and providing the configurable interface in the system for communication with the application.

16. The machine-readable non-transitory storage medium of claim 15, wherein the method further comprises associating at least one developer component with the configurable interface, the at least one developer component to provide functionality to the configurable interface client-side; and configuring configure the configurable interface with the at least one developer component client-side to present to the first user when using the configurable interface for communication with the system.

17. The machine-readable non-transitory storage medium of claim 15, wherein the configured interface is a web interface.

18. The machine-readable non-transitory storage medium of claim 15, wherein the configured interface is a programmatic interface.

19. A machine-readable non-transitory storage medium comprising instructions, which when executed by a machine, cause the machine to perform a method comprising:

receiving a communication in a system with a configurable interface, the configurable interface providing a user interface to enable communication in the system with a client operating on a client machine, the configurable interface receiving functionality server-side from at least one component to enable communication with an application hosted on an application server, the configurable interface to present information to a first user in a different manner than to a second user;

identifying at least one functional component from the at least one component relevant to the communication;

processing the communication with the at least one functional component;

receiving a result from the application as a result of processing the communication; and presenting the result to the client through the configurable interface.

* * * * *

UNITED STATES PATENT AND TRADEMARK OFFICE
CERTIFICATE OF CORRECTION

PATENT NO. : 7,801,949 B2
APPLICATION NO. : 11/646709
DATED : September 21, 2010
INVENTOR(S) : Neelakantan Sundaresan It is certified that error appears in the above-identified patent and that said Letters Patent is hereby corrected as shown below:

In column 14, line 26, in Claim 16, delete "comprises" and insert -- comprises: --, therefor.

In column 14, line 31, in Claim 16, delete "configure the" and insert -- the --, therefor.

Signed and Sealed this

Twenty-third Day of November, 2010

David J. Kappos
*Director of the United States Patent and Trademark Office*